Oct. 30, 1934.     R. J. BRITTAIN, JR     1,978,739
SEAL OR GUARD
Filed March 8, 1930
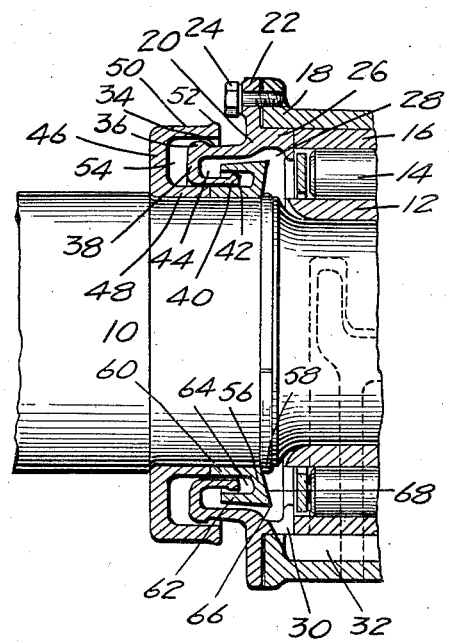
INVENTOR
RICHARD J. BRITTAIN, JR.
BY
Gales P. Moore
HIS ATTORNEY.

Patented Oct. 30, 1934

1,978,739

UNITED STATES PATENT OFFICE 1,978,739

SEAL OR GUARD

Richard J. Brittain, Jr., Bloomfield, N. J., assignor to General Motors Corporation, Detroit, Mich., a corporation of Delaware Application March 8, 1930, Serial No. 434,340

12 Claims. (Cl. 308—187)

This invention relates to seals or guards and comprises all the features of novelty herein disclosed. An object of the invention is to provide an improved sealing means between a shaft and a casing to prevent leakage of lubricant from the casing or to prevent entrance of foreign matter to the casing. Another object is to provide an improved guard for closing the space between a shaft and a casing to prevent the undesired passage of fluid or other material in any direction. To these ends and to improve generally and in detail upon devices of this character, the invention consists in the various matters hereinafter described and claimed.

In its broader aspects, the invention is not necessarily limited to the specific construction selected for illustrative purposes in the accompanying drawing in which The figure is a vertical sectional view of a portion of an axle box having the improved seal or guard.

The numeral 10 indicates a shaft or axle having a raceway sleeve 12 for antifriction bearings, herein shown as rollers 14 which run in an outer race sleeve 16 carried in the bore of a casing or box 18. The front end of the casing or box may be closed, as by an integral end wall (not shown) to retain lubricant and any suitable thrust devices may be provided to take the end thrust of the axle and limit its longitudinal shifting.

The rear end of the casing or box has an end cap 20 with a flange 22 clamped to a flange on the box by screw bolts 24. The cap is extended into the box as at 26 to engage the sleeve 16 and limit axial movement of the bearings. The interior of the extension has a drain groove 28 open towards the shaft to receive lubricant slung from the shaft and drain it to the under side of the axle and through a slot 30 into a reservoir 32. The cap 20 has an axially extended outer wall 34 which is tapered down to a peripheral rib or bead 36, thereby forming a peripheral drain groove. The cap also has a radial wall 38 and an axially extending inner wall 40 which is spaced from the axle and terminates in a short radial flange or rib 42. This leaves an annular drain groove at 44 to drain lubricant to the slot 30.

A guard ring 46, of substantially U-shaped cross section, has an axial flange 48 held on the axle against a rib. Another axial flange 50 surrounds and encloses the wall 34 of the end cap and terminates in a bead or rib 52. The guard ring prevents access of water or other foreign matter to the end cap except that little which will readily drain around the external groove on the tapering wall 34. The guard ring 46 is axially spaced from the cap at 54 so that longitudinal shifting of the axle can occur without contact of such parts. If any small amount of water gets in the space 54 it will drain out at the bottom from the inner surface of wall 50.

A guard ring 56, of substantially U-shaped cross section, is sleeved on the axle and retained by a spring ring 58, an inner axial flange 60 of the guard ring extending inside the cap wall 40 and abutting against the flange 48. The abutting flanges conform closely to the inner face of the wall 40. An outer axial flange 62 of the guard ring surrounds the cap wall 40 and extends into the drain groove 44. The guard ring is axially spaced from the end of the cap wall 40 as at 64 so that axial shifting of the axle can occur without contact of such parts. The outer surface of the flange 62 tapers outwardly a little to the edge or slinger rib 66 where it meets a tapering surface 68 in the plane of the drain groove 28. During rotation of the axle, the slinger rib 66 throws lubricant into the drain groove 28 and the tapering surface of flange 62 tends to prevent the lubricant from working towards the groove 44. The end of the sleeve 12 projects into the cap where it arrests creeping lubricant and also acts to sling the lubricant into the groove 28. Any lubricant which may reach groove 44, however, is drained back into the box. Leakage of fluid along the axle in any direction is thus effectively stopped by the drain surfaces and by the overlapping flanges on the end cap and guard rings.

I claim:

1. In a device for closing the space where a shaft projects into a casing, an outer wall projecting axially from the casing, a wall extending from the end of said outer wall towards the shaft, an inner wall projecting back inside the outer wall and spaced from the shaft, and a guard ring on the shaft, the guard ring having a flange entering the space between the shaft and said inner wall, the guard ring having another flange projecting axially between said inner and outer walls; substantially as described.

2. In a device for closing the space where a shaft projects into a casing, an outer wall projecting axially from the casing, a wall extending inwardly from the end of said outer wall towards the shaft, and a guard ring on the shaft, the guard ring having a flange making a close running joint between the shaft and said inwardly extending wall, the guard ring also having a flange with an outer surface tapering away from the shaft and from said inwardly extending wall; substantially as described.

3. In a device for closing the space between a shaft and a casing, a wall projecting axially of the casing and having an internal drain groove open towards the shaft, the wall having an inner portion spaced from the shaft, and a guard ring on the shaft, the guard ring having a flange entering the space between the shaft and said inner portion, the guard ring also having a flange with a tapering outer surface terminating in the plane of the drain groove; substantially as described.

4. In a device for closing the space between a shaft and a casing, an outer wall projecting axially of the casing and having an internal drain groove open towards the shaft, a wall extending from said outer wall towards the shaft, an inner wall projecting back inside the outer wall, and a guard ring on the shaft, the guard ring having a flange projecting between said outer and inner walls, the flange having a tapering outer surface terminating in the plane of the drain groove; substantially as described.

5. In a device for closing the space between a shaft and a casing, an outer wall projecting axially of the casing and having an internal drain groove, a wall extending from said outer wall towards the shaft, an inner wall projecting back inside the outer wall and spaced from the shaft, and a guard ring on the shaft, the guard having a portion entering the space between the shaft and said inner wall, the guard ring having a flange projecting axially between said inner and outer walls, the flange having a tapering outer surface terminating in the plane of the drain groove; substantially as described.

6. In a device for closing the space between a shaft and a casing, an outer wall projecting axially of the casing, a wall extending inwardly from said outer wall towards the shaft, an inner wall projecting back inside the outer wall, and a guard ring on the shaft, a portion of said guard ring entering between the shaft and said inner wall, another portion of the guard ring surrounding said outer wall; substantially as described.

7. In a device for closing the space between a shaft and a casing, a cap secured to the casing and having an outer wall projecting away from the casing, a wall extending from the end of said outer wall towards the shaft, an inner wall projecting back inside the outer wall, and a guard ring secured to the shaft and surrounding the outer wall of the cap; substantially as described.

8. In a device for closing the space between a shaft and a casing, a cap secured to the casing and having an outer wall projecting away from the casing, a wall extending from the outer wall towards the shaft, an inner wall projecting back inside the outer wall, and inner and outer guard rings secured to the shaft, the outer guard ring surrounding the outer wall of the cap, and the inner guard ring extending between the inner and outer walls of the cap; substantially as described.

9. In a device for closing the space between a shaft and a casing, a cap secured to the casing and having an outer wall projecting away from the casing, a wall extending from the outer wall towards the shaft, an inner wall projecting back inside the outer wall, an outer guard ring on the shaft and having a flange entering between the shaft and the inner wall of the cap, the guard ring having another flange surrounding the outer wall of the cap, an inner guard ring on the shaft and having a flange entering between the shaft and the inner wall of the cap, the inner guard ring having another flange extending between the inner and outer walls of the cap; substantially as described.

10. In a device for closing the space between a shaft and a casing, a cap secured to the casing and having walls one within the other, and inner and outer guard rings secured to the shaft and each enclosing a wall of the cap; substantially as described.

11. In a device for closing the space between a shaft and a casing, a cap secured to the casing, the cap having reversely extending outer and inner walls with one wall inside the other, and inner and outer guard rings secured to the shaft and each enclosing one of said walls of the cap; substantially as described.

12. In a device of the character described, a casing, a shaft extending into the casing, an antifriction bearing between the shaft and the casing to provide for relative rotation of said members, the inner race ring of the bearing being sleeved on the shaft, a cap secured to the casing and surrounding the shaft, a peripheral groove formed on the interior of the cap and open towards the shaft, and the inner race ring of the bearing projecting into the cap and terminating substantially at the plane of the groove; substantially as described.

RICHARD J. BRITTAIN, Jr.